US012456811B2

(12) United States Patent
Yi et al.

(10) Patent No.: US 12,456,811 B2
(45) Date of Patent: Oct. 28, 2025

(54) ANTENNA SUBSTRATE AND ANTENNA MODULE COMPRISING THE SAME

(71) Applicant: SAMSUNG ELECTRO-MECHANICS CO., LTD., Suwon-si (KR)

(72) Inventors: Moon Hee Yi, Suwon-si (KR); Tae Seong Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 18/383,165

(22) Filed: Oct. 24, 2023

(65) Prior Publication Data

US 2024/0055767 A1 Feb. 15, 2024

Related U.S. Application Data

(63) Continuation of application No. 16/789,039, filed on Feb. 12, 2020, now Pat. No. 11,831,089.

(30) Foreign Application Priority Data

Dec. 10, 2019 (KR) ........................ 10-2019-0163278

(51) Int. Cl.
*H01Q 1/38* (2006.01)
*H01Q 1/24* (2006.01)
(Continued)

(52) U.S. Cl.
CPC ............. *H01Q 9/045* (2013.01); *H01Q 1/243* (2013.01); *H01Q 1/422* (2013.01)

(58) Field of Classification Search
CPC ........ H01Q 9/045; H01Q 1/243; H01Q 1/422; H01Q 1/38; H01Q 9/0414; H01Q 9/065;
(Continued)

(56) References Cited

U.S. PATENT DOCUMENTS 8,786,060 B2 * 7/2014 Yen ........................ H01Q 23/00 438/63
9,007,273 B2 * 4/2015 Liao ........................ H01L 25/16 343/841
(Continued)

FOREIGN PATENT DOCUMENTS

CN 110071363 A 7/2019
KR 10-2014-0115808 A 10/2014
(Continued)

OTHER PUBLICATIONS

Office Action dated Feb. 15, 2025 issued in the related Chinese Patent Application No. 202010278176.9. with English translation.

*Primary Examiner* — Dimary S Lopez Cruz
*Assistant Examiner* — Bamidele A Immanuel
(74) *Attorney, Agent, or Firm* — Morgan, Lewis & Bockius LLP

(57) ABSTRACT

An antenna substrate and an antenna module including the same are provided. The antenna substrate includes an antenna unit including first and second pattern layers adjacent to each other and disposed on different levels and a first insulating layer providing a first insulating region between the first and second pattern layers, and a feed unit including third and fourth pattern layers adjacent to each other and disposed on different levels and a second insulating layer providing a second insulating region between the third and fourth pattern layers. Each of the first and second pattern layers includes an antenna pattern, and each of the third and fourth pattern layers includes a feed pattern. The antenna unit is disposed on the feed unit. The first insulating region is thicker than the second insulating region.

14 Claims, 10 Drawing Sheets

(51) Int. Cl.
*H01Q 1/42* (2006.01)
*H01Q 9/04* (2006.01)

(58) Field of Classification Search
CPC ...... H01Q 15/08; H01Q 15/10; H01Q 19/005; H01Q 21/08; H01Q 23/00; H01Q 25/00; H01Q 1/12; H01Q 1/241; H01Q 1/52
See application file for complete search history.

(56) References Cited

U.S. PATENT DOCUMENTS

| | | | | |
|---|---|---|---|---|
| 9,153,542 | B2 * | 10/2015 | Lin | H01Q 21/065 |
| 9,331,030 | B1 * | 5/2016 | Tsai | H01L 24/20 |
| 9,935,065 | B1 * | 4/2018 | Baheti | H01L 23/66 |
| 10,157,834 | B1 * | 12/2018 | Tang | H01L 23/53228 |
| 2005/0088260 | A1 * | 4/2005 | Ajioka | H01Q 1/2283 257/E23.114 |
| 2009/0322643 | A1 | 12/2009 | Choudhury | |
| 2010/0148316 | A1 * | 6/2010 | Kim | H01L 24/19 438/109 |
| 2012/0212384 | A1 * | 8/2012 | Kam | H01Q 1/2283 343/834 |
| 2013/0099006 | A1 * | 4/2013 | Hong | H01Q 1/2283 235/492 |
| 2014/0145883 | A1 * | 5/2014 | Baks | H01L 23/66 343/700 MS |
| 2015/0249283 | A1 * | 9/2015 | Watanabe | H01Q 1/243 343/702 |
| 2015/0325925 | A1 * | 11/2015 | Kamgaing | H01L 21/4853 343/893 |
| 2016/0049723 | A1 * | 2/2016 | Baks | H01Q 9/0457 343/848 |
| 2017/0125895 | A1 | 5/2017 | Baks et al. | |
| 2017/0346185 | A1 * | 11/2017 | Wang | H01Q 3/24 |
| 2018/0090851 | A1 * | 3/2018 | Feldman | H01Q 1/42 |
| 2018/0159203 | A1 * | 6/2018 | Baks | H01Q 9/045 |
| 2018/0247905 | A1 * | 8/2018 | Yu | H01L 21/6835 |
| 2018/0286822 | A1 * | 10/2018 | Kim | H01L 23/13 |
| 2019/0020114 | A1 * | 1/2019 | Paulotto | H01Q 9/40 |
| 2019/0036207 | A1 * | 1/2019 | Kim | H01Q 21/08 |
| 2019/0067219 | A1 * | 2/2019 | Lasiter | H01L 23/66 |
| 2019/0096829 | A1 * | 3/2019 | Tang | H01L 21/486 |
| 2019/0173195 | A1 | 6/2019 | Kim et al. | |
| 2019/0181096 | A1 | 6/2019 | Wu et al. | |
| 2019/0229426 | A1 | 7/2019 | Kim et al. | |
| 2019/0260138 | A1 * | 8/2019 | Gu | H01L 23/3675 |
| 2019/0319338 | A1 | 10/2019 | Gu et al. | |
| 2019/0319350 | A1 | 10/2019 | Sakurai | |
| 2019/0333879 | A1 | 10/2019 | Chen et al. | |
| 2019/0333882 | A1 * | 10/2019 | Kamgaing | H01L 23/49827 |
| 2019/0348747 | A1 | 11/2019 | Liu et al. | |
| 2019/0348748 | A1 | 11/2019 | Liu et al. | |
| 2019/0348756 | A1 | 11/2019 | Liu et al. | |
| 2019/0393172 | A1 * | 12/2019 | Pietambaram | H01L 24/19 |
| 2020/0098709 | A1 * | 3/2020 | Lin | H01L 21/4857 |
| 2020/0106192 | A1 * | 4/2020 | Avser | H01Q 1/405 |
| 2020/0412021 | A1 * | 12/2020 | Chang | H01Q 5/371 |
| 2021/0305699 | A1 * | 9/2021 | Min | H01Q 9/0414 |

FOREIGN PATENT DOCUMENTS

| | | | | |
|---|---|---|---|---|
| KR | 10-2019-0052486 A | | 5/2019 | |
| KR | 102494338 B1 | * | 2/2023 | H05K 1/09 |

* cited by examiner

| 3D max Gain | LOW FREQUENCY BAND | | | | HIGH FREQUENCY BAND | | | |
|---|---|---|---|---|---|---|---|---|
| | 27.5 [GHz] | 28 [GHz] | 28.35 [GHz] | Aver. [GHz] | 37 [GHz] | 38.5 [GHz] | 40 [GHz] | Aver. [GHz] |
| COMPARATIVE EXAMPLE | 3.685 | 3.920 | 3.638 | 3.75 | 4.285 | 4.843 | 4.654 | 4.59 |
| EXAMPLE | 3.851 | 4.219 | 4.003 | 4.02 | 4.288 | 5.062 | 5.388 | 4.91 |

FIG. 7

ANTENNA SUBSTRATE AND ANTENNA MODULE COMPRISING THE SAME

CROSS-REFERENCE TO RELATED APPLICATION(S)

This application is the continuation application of U.S. patent application Ser. No. 16/789,039 filed on Feb. 12, 2020, which claims benefit of priority to Korean Patent Application No. 10-2019-0163278 filed on Dec. 10, 2019 in the Korean Intellectual Property Office, the disclosure of which is incorporated herein by reference in its entirety.

TECHNICAL FIELD

The present inventive concept relates to an antenna substrate and an antenna module including the same.

BACKGROUND

As the mmWave band is applied to the mobile communications field, a system of operating a smartphone has changed. For example, a novel antenna system, capable of receiving a high frequency band, should be adopted, and an antenna module, capable of covering the mmWave band as a component therefor, is required. Meanwhile, a high frequency has strong linearity, while lacking transparency and reflectivity in a manner different from short wavelengths according to the related art. Therefore, it may be sensitive to loss and interference in a signal transmission process between an integrated circuit (IC) such as a radio frequency integrated circuit (RFIC) and an antenna.

SUMMARY

An aspect of the present inventive concept is to provide an antenna substrate, capable of improving antenna performance, and an antenna module including the same.

Another aspect of the present inventive concept is to provide an antenna substrate in which miniaturization is possible and an antenna module including the same.

According to an aspect of the present disclosure, an antenna substrate including an antenna unit and a feed unit is manufactured, and, in this case, an insulating distance between pattern layers of an antenna unit is greater than an insulating distance between pattern layers of a feed unit.

According to an aspect of the present inventive concept, an antenna substrate includes an antenna unit including first and second pattern layers, adjacent to each other and disposed on different levels, and a first insulating layer providing a first insulating region between the first and second pattern layers, and a feed unit including third and fourth pattern layers, adjacent to each other and disposed on different levels, and a second insulating layer providing a second insulating region between the third and fourth pattern layers. Each of the first and second pattern layers includes an antenna pattern, and each of the third and fourth pattern layers includes a feed pattern. The antenna unit is disposed on the feed unit. The first insulating region is thicker than the second insulating region.

According to another aspect of the present inventive concept, an antenna module includes: an antenna substrate including an antenna unit including first and second pattern layers adjacent to each other and disposed on different levels and a first insulating layer providing a first insulating region between the first and second pattern layers, and a feed unit including third and fourth pattern layers adjacent to each other and disposed on different levels and a second insulating layer providing a second insulating region between the third and fourth pattern layers, the antenna unit being disposed on the feed unit; and an electronic component disposed on a side of the feed unit opposite to a side of the feed unit on which the antenna unit is disposed, and connected to at least one of the third pattern layer or the fourth pattern layer. Each of the first and second pattern layers includes an antenna pattern, and each of the third and fourth pattern layers includes a feed pattern. The first insulating region is thicker than the second insulating region.

According to another aspect of the present inventive concept, an antenna substrate includes: a plurality of first pattern layers each including an antenna pattern; a plurality of first insulating layers respectively separating adjacent two of the plurality of first pattern layers; a plurality of second pattern layers each including a feed pattern; a plurality of second insulating layers respectively separating adjacent two of the plurality of second pattern layers; a third insulating layer disposed between a lowermost one of the plurality of first pattern layers and an uppermost one of the second pattern layers. The plurality of first pattern layers and the plurality of first insulating layers are disposed on one side of the third insulating layer. The plurality of second pattern layers and the plurality of second insulating layers are disposed on another side of the third insulating layer opposing the one side. A thickness of each of the plurality of first insulating layers disposed between adjacent two of the plurality of first pattern layers is greater than a thickness of each of the plurality of second insulating layers disposed between adjacent two of the plurality of second pattern layers.

BRIEF DESCRIPTION OF DRAWINGS

The above and other aspects, features and other advantages of the present disclosure will be more clearly understood from the following detailed description, taken in conjunction with the accompanying drawings, in which:

FIG. 7 schematically illustrates antenna gain effects of the antenna module of FIG. 3;

DETAILED DESCRIPTION

Figure 1:
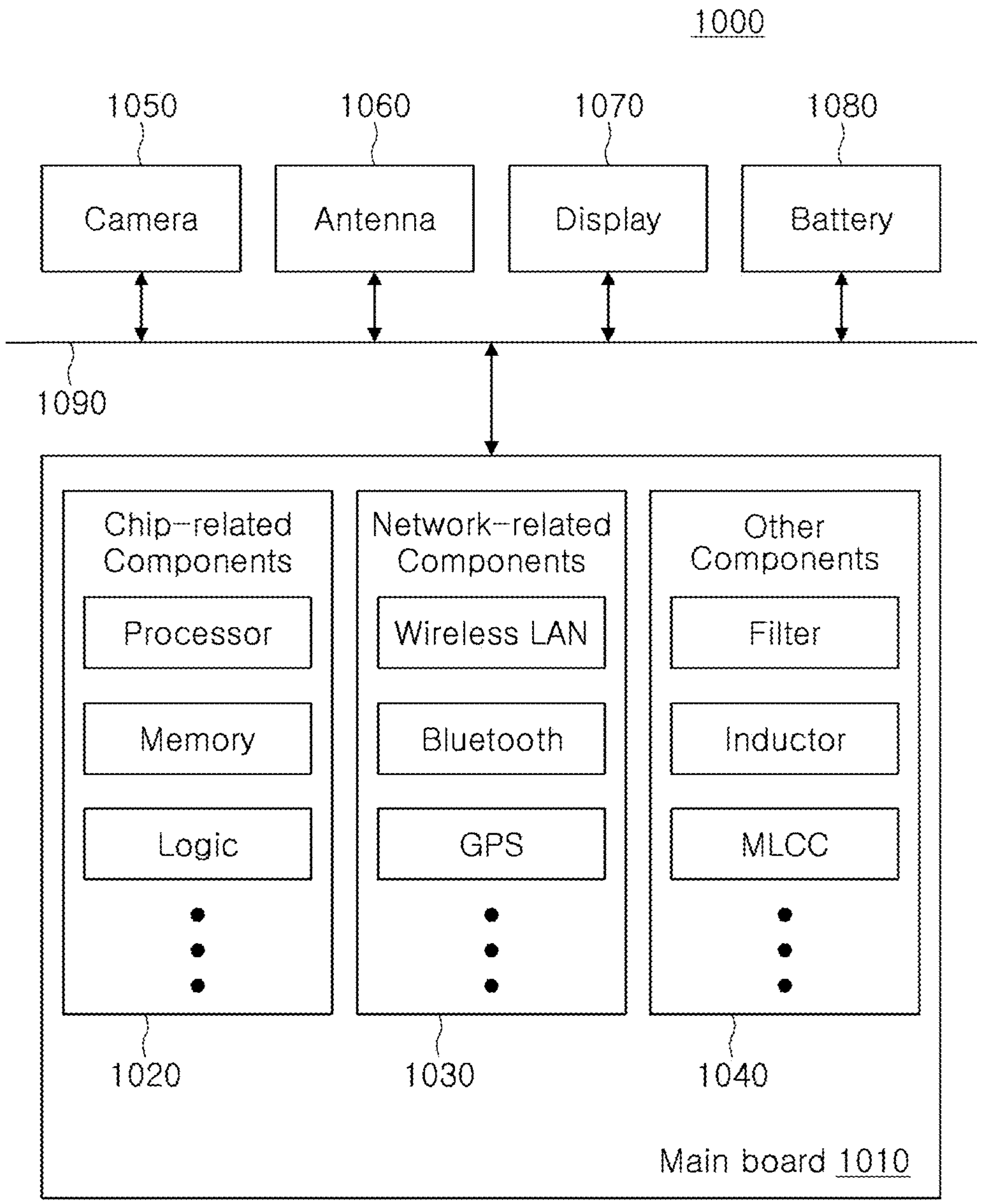
FIG. 1 is a block diagram schematically illustrating an example of an electronic device system.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

FIG. 1 is a block diagram schematically illustrating an example of an electronic device system.

Referring to FIG. 1, an electronic device 1000 may accommodate a mainboard 1010 therein. The mainboard 1010 may include chip associated components 1020, network associated components 1030, other components 1040, or the like, physically or electrically connected thereto. These electronic components may be connected to others to be described below to form various signal lines 1090.

The chip associated components 1020 may include a memory chip such as a volatile memory (for example, a dynamic random access memory (DRAM)), a non-volatile memory (for example, a read only memory (ROM)), a flash memory, or the like; an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital converter, an application-specific integrated circuit (ASIC), or the like, or the like. However, the chip associated components 1020 are not limited thereto, and may include other types of chip associated electronic components. In addition, the chip associated components 1020 may be combined with each other. The chip associated components 1020 may have a package form including the above-mentioned chip or electronic component.

The network associated components 1030 may include protocols such as wireless fidelity (Wi-Fi) (Institute of Electrical and Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+(HSPA+), high speed downlink packet access+(HSDPA+), high speed uplink packet access+(HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G, and 5G protocols, and any other wireless and wired protocols designated after the above-mentioned protocols. However, the network associated components 1030 are not limited thereto, but may also include a variety of other wireless or wired standards or protocols. In addition, the network associated components 1030 may be combined with each other, together with the chip associated electronic components 1020 described above.

Other components 1040 may include a high frequency inductor, a ferrite inductor, a power inductor, ferrite beads, a low temperature co-fired ceramic (LTCC), an electromagnetic interference (EMI) filter, a multilayer ceramic capacitor (MLCC), or the like. However, other components 1040 are not limited thereto, but may also include passive components in the form of a chip component used for various other purposes, or the like. In addition, other components 1040 may be combined with each other, together with the chip associated electronic components 1020 or the network associated electronic components 1030 described above.

Depending on a type of the electronic device 1000, the electronic device 1000 includes other electronic components that may or may not be physically or electrically connected to the mainboard 1010. As an example of other electronic components, a camera module 1050, an antenna module 1060, a display 1070, a battery 1080, and the like may be provided However, the other electronic components are not limited thereto, and may be an audio codec, a video codec, a power amplifier, a compass, an accelerometer, a gyroscope, a speaker, a mass storage device (for example, a hard disk drive), a compact disk (CD), a digital versatile disk (DVD), or the like. In addition, the other electronic components, used for various purposes, may be included according to the type of the electronic device 1000.

The electronic device 1000 may be a smartphone, a personal digital assistant (PDA), a digital video camera, a digital still camera, a network system, a computer, a monitor, a tablet PC, a laptop PC, a netbook PC, a television, a video game machine, a smartwatch, an automotive component, or the like. However, the electronic device 1000 is not limited thereto, and may be any other electronic device able to process data.

Figure 2:
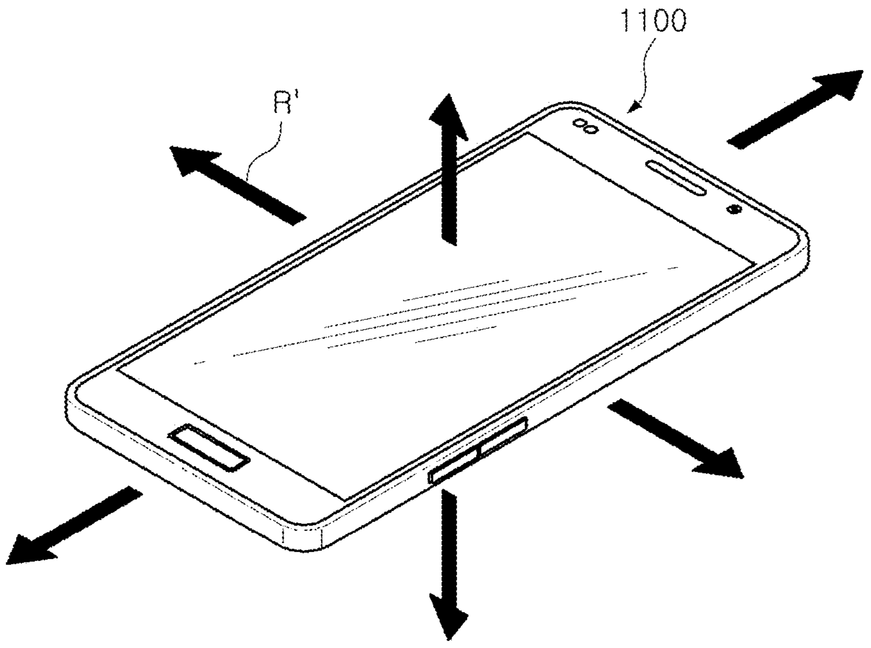
FIG. 2 is a schematic perspective view illustrating an example of an electronic device.

FIG. 2 is a schematic perspective view illustrating an example of an electronic device.

Referring to FIG. 2, an electronic device may be, for example, a smartphone 1100. An antenna may be applied to the smartphone 1100 in the form of a substrate. Moreover, in the smartphone 1100, a radio frequency integrated circuit (RFIC) may be mounted on an antenna substrate by itself or in the form of a semiconductor package so that the antenna module may be applied. In the smartphone 1100, the RFIC and the antenna are electrically connected, so radiation R' of antenna signals may be possible in various directions. The RFIC or a semiconductor package including the same, and an antenna module provided for a substrate including an antenna may be applied to an electronic device such as the smartphone 1100 while having various forms. On the other hand, the electronic device, to which the antenna is applied, is not limited to the smartphone 1100, and there may be other types of electronic devices as described above other than the smartphone 1100.

Figure 3:
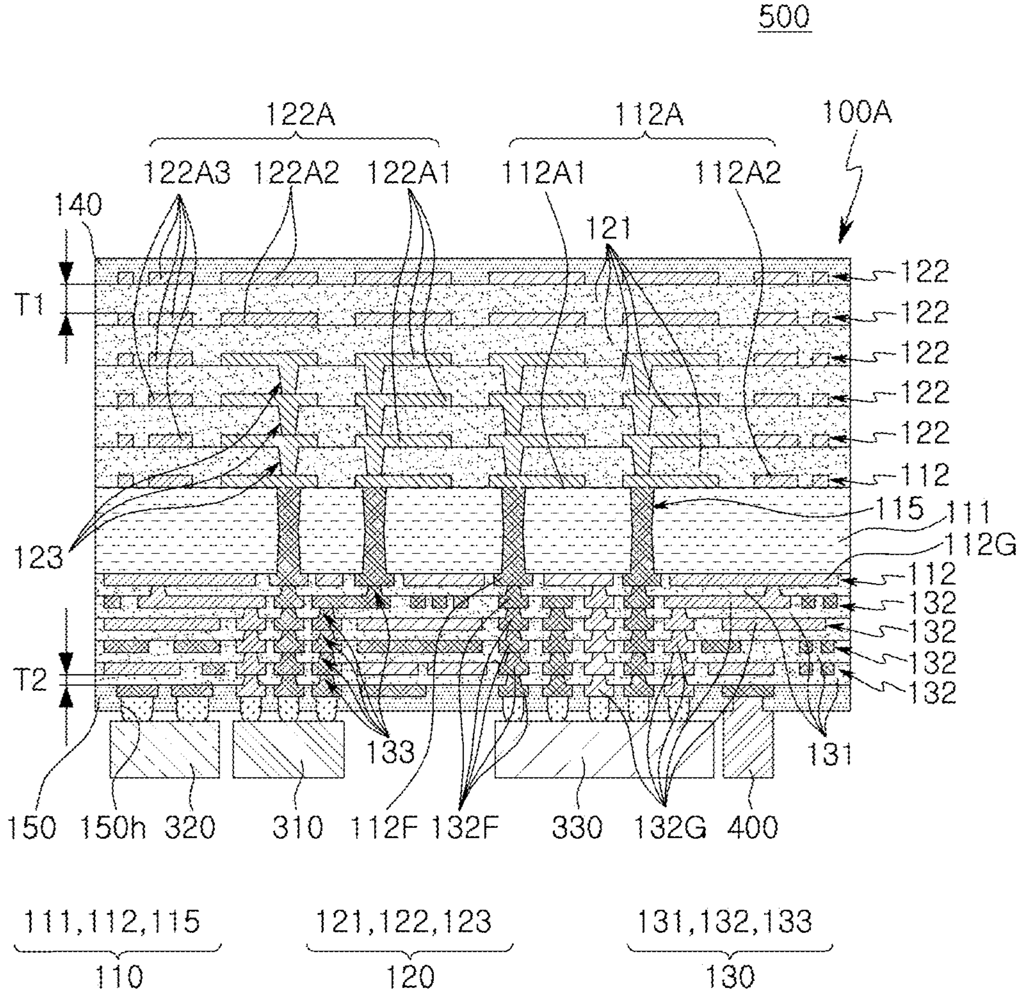
FIG. 3 is a schematic cross-sectional view illustrating an example of an antenna module.

FIG. 3 is a schematic cross-sectional view illustrating an example of an antenna module.

Figure 4:
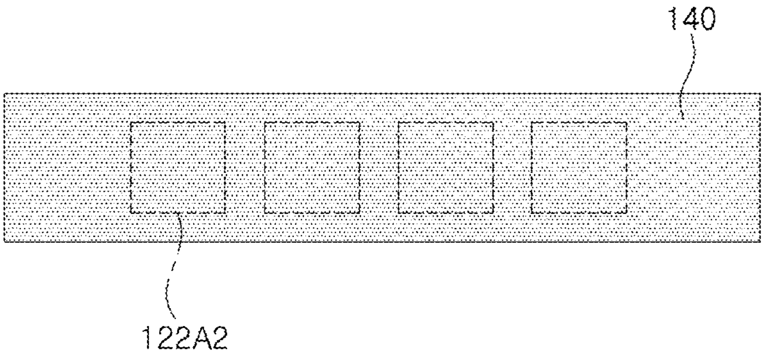
FIG. 4 is a schematic plan view of the antenna module when viewed from above.

FIG. 4 is a schematic plan view of the antenna module when viewed from above.

Figure 5:
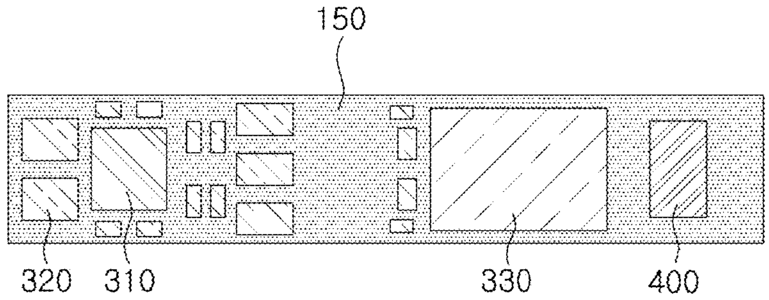
FIG. 5 is a schematic plan view of the antenna module when viewed from below.

FIG. 5 is a schematic plan view of the antenna module when viewed from below.

Referring to FIGS. 3, 4, and 5, an antenna module 500 according to an embodiment includes an antenna substrate 100A including a core portion 110, an antenna unit 120 disposed above the core portion 110, and a feed unit 130 disposed below the core portion 110, and one or more electronic components 310, 320, and 330 disposed below the feed unit 130 of the antenna substrate 100A. The core portion 110 includes a core layer 111, core wiring layers 112 disposed on both surfaces of the core layer 111, and a through via layer 113 connecting the core wiring layers 112 while passing through the core layer 111. The antenna unit 120 includes a plurality of insulating layers 121, a plurality of pattern layers 122, and a plurality of connection via layers 123. The feed unit 130 includes a plurality of insulating layers 131, a plurality of pattern layers 132, and a plurality of connection via layers 133. The antenna unit 120 includes one or more combinations of two pattern layers 122 disposed vertically adjacent to each other, each of the two pattern layers including an antenna pattern 122A, and any one insulating layer 121 providing an insulating region between the pattern layers 122 adjacent to each other. The feed unit 130 includes one or more combinations of two pattern layers 132 disposed vertically adjacent to each other, each of the two pattern layers including a feed pattern 132F, and any one insulating layer 131 providing an insulating region between the pattern layers 132. In this case, a thickness T1 of an insulating region of the antenna unit 120 is greater than a thickness T2 of an insulating region of the feed unit 130.

As described above, the antenna substrate 100A according to an embodiment allows an insulating distance between pattern layers 122 of the antenna unit 120 to be relatively thicker, while allowing an insulating distance between pattern layers 132 of the feed unit 130 to be relatively thinner. Thus, even in a condition in which a change in an overall thickness of the antenna substrate 100A and the antenna module 500 including the same is not significant, an insulating distance between the antenna patterns 122A may be increased, and as a result, the performance of the antenna could be improved even under the limited conditions. For example, both a low frequency band and a high frequency bandwidth of an antenna could be increased, and both a gain of the low frequency band and a gain of the high frequency band of the antenna could also be increased.

Meanwhile, an antenna applied to the antenna substrate 100A according to an embodiment may be a patch antenna. Alternatively, the antenna may be a combination of a patch antenna and a dipole antenna to improve signal transmission. In one example, as described above, as the performance of the antenna could be improved by adjusting the insulating distance, a patch antenna to be applied could be miniaturized. When the patch antenna is miniaturized, a width of an antenna substrate 100A including a patch antenna and/or a dipole antenna and an antenna module 500 including the same may also be reduced. Thus, the antenna module 500 in more various forms may be applied to an electronic device, and, for example, the antenna module could be more easily mounted on a side surface of the electronic device. In one example, the patch antenna is introduced in the form of 1×4, but is not limited thereto, and the patch antenna may be introduced in another form such as 2×2 or 4×4.

Meanwhile, the antenna substrate 100A according to an embodiment may have a vertically asymmetrical shape based on the core portion 110. For example, the number of insulating layers 121 of the antenna unit 120 and the number of insulating layers 131 of the feed unit 130 may be equal to each other. In this case, a thickness of each insulating layer 121 of the antenna unit 120 may be greater than a thickness of each insulating layer 131 of the feed unit 130. Thus, a thickness of the antenna unit 120 may be greater than a thickness of the feed unit 130. As described above, regarding a cored-type PCB, as described above, in order to improve antenna characteristics, an insulating distance between pattern layers 122 of the antenna unit 120 is relatively thick, while an insulating distance between pattern layers 132 of the feed unit 130 is relatively thin. Thus, a substrate having a vertically asymmetrical shape may be provided.

Meanwhile, in the antenna substrate 100A according to an embodiment, a core wiring layer 112 in an upper portion of the core portion 110 may include an antenna pattern 112A, and a core wiring layer 112 in a lower portion of the core portion may include a ground pattern 112G. The core wiring layer 112 in a lower portion may further include a feed pattern 112F formed in a hole region of the ground pattern 112G. In this case, an insulating layer 121 in a lowermost portion of the antenna unit 120 may provide an insulating region between the pattern layer 122 in a lowermost portion of the antenna unit 120 and a core wiring layer 112 in an upper portion of the core portion 110. Moreover, an insulating layer 131 in an uppermost portion of the feed unit 130 may provide an insulating region between the pattern layer 132 in an uppermost portion of the feed unit 130 and the core wiring layer 112 in a lower portion of the core portion 110. In this case, the insulating region, provided by an insulating layer 121 in a lowermost portion of the antenna unit 120, may be thicker than an insulating region, provided by an insulating layer 131 in an uppermost portion of the feed unit 130. The antenna, applied in an embodiment, may also include an antenna pattern 112A and a ground pattern 112G, included in the core wiring layer 112 of the core portion 110, and performance of an antenna may be more easily improved due to such a difference between the insulating distances.

Hereinafter, an antenna substrate 100A according to an embodiment and components of an antenna module 500 including the same will be described in more detail with reference to the drawings.

For example, an insulating material may be used as the material of the core layer 111. In this case, the insulating material may be a thermosetting resin such as an epoxy resin, a thermoplastic resin such as a polyimide resin, or a material including a reinforcement such as a glass fiber, a glass cloth, a glass fabric, and/or an inorganic filler, for example, copper clad laminate (CCL), or unclad CCL, or the like. If necessary, a core layer 111 for improving the bending control may be a metal plate or a glass plate, and may be a ceramic plate. Meanwhile, a metal plate may be an alloy containing nickel (Ni) and iron (Fe), in addition to copper (Cu), for example, a material such as Invar or Kovar. Moreover, a material of the core layer 111 may be a Liquid Crystal Polymer (LCP), Polytetrafluoroethylene (PTFE), or a derivative thereof. The material of the core layer 111 may be a material having a low dielectric loss rate (Df), among the above mentioned materials. The core layer 111 may be thicker than a thickness of each of the insulating layers 121 and 131 for the purpose of bending control, and may have excellent rigidity as compared with each of the insulating layers 121 and 131. For example, the core layer 111 may have an elastic modulus greater than each of the insulating layers 121 and 131.

A material of the core wiring layer 112 may be a metallic material, and, in this case, the metallic material may be copper (Cu), aluminum (Al), silver (Ag), tin (Sn), gold (Au), nickel (Ni), lead (Pb), titanium (Ti), or alloys thereof. The core wiring layer 112 may be formed using a plating process, for example, an Additive Process (AP), a Semi AP (SAP), a Modified SAP (MSAP), Tenting (TT), or the like, and as a result, each core wiring layer may include a seed layer, an electroless plating layer, and an electrolytic plating layer formed based on the seed layer. The core wiring layer 112 may perform various functions depending on a design of a corresponding layer. For example, the core wiring layer may include an antenna pattern 112A, a ground pattern 112G, a power pattern, a signal pattern, or the like. Here, the signal pattern may include a pattern for various signals except for an antenna pattern 112A, a ground pattern 112G, and a power pattern, for example, a feed pattern 112F. Each pattern of the core wiring layer 112 may include a line pattern, a plane pattern, and/or a pad pattern.

A material of the through via layer 115 may also be a metallic material such as copper (Cu), aluminum (Al), silver (Ag), tin (Sn), gold (Au), nickel (Ni), lead (Pb), titanium (Ti), or alloys thereof. The through via layer 115 may also be formed using a plating process such as AP, SAP, MSAP, TT, or the like, and as a result, each through via layer may include a seed layer, an electroless plating layer, and an electrolytic plating layer formed based on the seed layer. The through via layer 115 may perform various functions depending on a design thereof. For example, the through via layer may include a through-via for antenna connection, a through-via for signal connection, a through-via for ground connection, a through-via for power connection, or the like. Here, the through via for signal connection may include a through via for connection of various signals except for a through via for antenna connection, a through via for ground connection, and a through via for power connection, for example, a through via for feeding. The through via may be completely filled with a metallic material, or the metallic material may be formed along a wall of a via hole. In addition, the through via may have various shapes such as a cylinder shape, an hourglass shape, and the like.

The insulating layers 121 and 131 may provide an insulating region for formation of a multilayer pattern on both sides based on the core layer 111. The material of the insulating layers 121 and 131 may be an insulating material. In this case, each insulating material may be a thermosetting resin such as an epoxy resin, a thermoplastic resin such as a polyimid resin, or a material including a reinforcement such as a glass fiber and/or an inorganic filler with the same, for example, prepreg, an Ajinomoto Build-up Film (ABF), or the like. Moreover, the material of the insulating layers 121 and 131 may include at least one among a Liquid crystal polymer (LCP), Polyimide (PI), a Cycloolefin polymer (COP), Polyphenylene ether (PPE), Polyether ether ketone (PEEK), and Polytetrafluoroethylene (PTFE), or a derivative thereof. Each of the insulating layers 121 and 131 may be a material having a low dielectric loss rate (Df), among the above mentioned materials. The materials of the insulating layers 121 and 131 may be the same as each other, and may also be different from each other. The boundaries between respective insulating layers 121 and 131, adjacent to each other, may be clear or unclear. As an example without limitations, a dielectric constant (Dk) of each of the insulating layers 121 may be greater than a dielectric constant (Dk) of each of the insulating layers 131.

A material of the pattern layers 122 and 132 may also be a metallic material such as copper (Cu), aluminum (Al), silver (Ag), tin (Sn), gold (Au), nickel (Ni), lead (Pb), titanium (Ti), or alloys thereof. Each of the pattern layers 122 and 132 may also be formed using a plating process such as AP, SAP, MSAP, TT, or the like, and as a result, each through via layer may include a seed layer, an electroless plating layer, and an electrolytic plating layer formed based on the seed layer. The pattern layers 122 and 132 may perform various functions depending on designs of layers corresponding thereto. For example, the pattern layers 122 may include an antenna pattern 122A, a power pattern, a signal pattern, or the like, and the pattern layers 132 may include a ground pattern 132G, a power pattern, a signal pattern, or the like. Here, the signal pattern may include a pattern for various signals except for an antenna pattern 122A, a ground pattern 132G, and a power pattern, for example, a feed pattern 132F. Each pattern of the pattern layers 122 and 132 may include a line pattern, a plane pattern, and/or a pad pattern.

A material of the connection via layers 123 and 133 may also be a metallic material such as copper (Cu), aluminum (Al), silver (Ag), tin (Sn), gold (Au), nickel (Ni), lead (Pb), titanium (Ti), or alloys thereof. Each of the connection via layers 123 and 133 may also be formed using a plating process such as AP, SAP, MSAP, TT, or the like, and as a result, each through via layer may include a seed layer, an electroless plating layer, and an electrolytic plating layer formed based on the seed layer. The connection via layers 123 and 133 may perform various functions depending on a design thereof. For example, the connection via layer may include a connection via for antenna connection, a connection via for signal connection, a connection via for ground connection, a connection via for power connection, or the like. Here, the connection via for signal connection may include a connection via for connection of various signals except for a connection via for antenna connection, a connection via for ground connection, and a connection via for power connection, for example, a connection via for feeding. The connection via may be completely filled with a metallic material, or the metallic material may be formed along a wall of a via hole. In addition, the connection via may have various shapes such as a tapered shape, and the like.

An antenna pattern 122A of the antenna unit 120 may include a patch pattern 122A1. An antenna pattern 112A of the core portion 110 may also include a patch pattern 112A1. The patch patterns 112A1 and 112A1 may receive an RF signal from the feed pattern 112F of the core portion 110 and a feed pattern 132F of the feed unit 130 and transmit the RF signal in a thickness direction (a Z-direction), and transmit the RF signal, transmitted in the thickness direction, to the feed pattern 112F of the core portion 110 and the feed pattern 132F of the feed unit 130. The patch patterns 112A1 and 112A1 may have an intrinsic resonant frequency depending on intrinsic factors such as a shape, a size, a height, a dielectric constant of an insulating layer, for example, 28 GHz, 39 GHz, or the like. For example, the patch patterns 122A1 and 112A1 may be electrically connected to the feed pattern 112F of the core portion 110 and the feed pattern 132F of the feed unit 130 through a through-via for feeding a through via layer 115 of the core portion 110, a connection via for feeding a connection via layer 133 of the feed unit 130, and the like, and may thus transmit and receive a horizontal pole RF signal and a vertical pole RF signal, which is polarized each other.

The antenna pattern 122A of the antenna unit 120 may include a first coupling pattern 122A2. The first coupling pattern 122A2 may be disposed above the patch patterns 122A1 and 112A1, for example, in a thickness direction. Through the patch patterns 122A1 and 112A1 according to the electromagnetic coupling of the first coupling pattern 122A2 and the patch patterns 122A1 and 112A1, an antenna, applied to the antenna substrate 100A, may have an additional resonant frequency adjacent to the intrinsic resonant frequency described above, resulting in a wider bandwidth. The first coupling patterns 122A2, adjacent to each other and disposed on different levels, of the antenna unit 120, may also be electromagnetically coupled to each other, and the antenna, applied to the antenna substrate 100A, may have a wider bandwidth.

The antenna pattern 122A of the antenna unit 120 may further include a second coupling pattern 122A3. The second coupling pattern 122A3 of the antenna unit 120 may surround at least a portion of each of the patch pattern 122A1 and the first coupling pattern 122A2, of the antenna unit 120, and may thus be electromagnetically coupled with each of the patch pattern 122A1 and the first coupling pattern 122A2 of the antenna unit 120 as a result. The antenna pattern 112A of the core portion 110 may also include a coupling pattern 112A2. The coupling pattern 112A2 of the core portion 110 may surround at least a portion of the patch pattern 112A1 of the core portion 110, and may thus be electromagnetically coupled with the patch pattern 112A1 of the core portion 110 as a result. The second coupling patterns 122A3, adjacent to each other and disposed on different levels, of the antenna unit 120, may be electromagnetically coupled to each other, and may be electromagnetically coupled to the coupling pattern 112A2 of the core portion 110. Through such couplings, a balanced coupling may be provided. In this regard, a bandwidth of an antenna, applied to the antenna substrate 100A, could be wider as compared with a size.

When an optimal connection point with a connection via and/or a through via at the patch patterns 122A1 and 112A1 is close to an edge of each of the patch patterns 122A1 and 112A1 in the first direction (for example: 0 degree direction), a surface current, flowing the patch patterns 122A1 and 112A1, may flow to each of the patch patterns 122A1 and 112A1 in the third direction (for example: 180 degrees direction) according to the RF signal transmission and reception. In this case, a surface current may be distributed in the second direction (for example: 90 degrees direction) and the fourth direction (for example: 270 degrees direction), and the second coupling pattern 122A3 and the coupling pattern 112A2 may guide an RF signal, leaking to a side surface due to the distribution of the surface current in the second and fourth directions, in a direction of an upper surface. Accordingly, a radiation pattern of the patch patterns 122A1 and 112A1 may be concentrated in the direction of an upper surface, and thus antenna performance may be improved. For example, the second coupling pattern 122A3 and the coupling pattern 112A2 may be arranged repeatedly while each of the second coupling pattern and the coupling pattern has a substantially identical shape. Accordingly, a plurality of second coupling patterns 122A3 and a plurality of coupling patterns 112A2 may have electromagnetic bandgap characteristics, and may have a negative refractive index for the RF signal in a specific frequency band. Thus, the second coupling pattern 122A3 and the coupling pattern 112A2 may induce a path of an RF signal of the patch patterns 122A1 and 112A1 further in a thickness direction.

Each of the second coupling pattern 122A3 and the coupling pattern 112A2 may be electrically separated from the ground pattern 112G. In this regard, since more adaptive characteristics may be provided with respect to the RF signal having a frequency adjacent to a frequency band of the patch patterns 122A1 and 112A1, a bandwidth of an antenna, applied to the antenna substrate 100A, may be further widened. The patch patterns 122A1 and 112A1, the first coupling pattern 122A2, the second coupling pattern 122A2, and the coupling pattern 112A2 may be electrically separated from each other. Accordingly, since the equivalent capacitance and equivalent inductance of the antenna, applied to the antenna substrate 100A, could be distributed in a balanced manner, a plurality of resonant frequencies of the antenna, applied to the antenna substrate 100A, may be designed efficiently, and a bandwidth could be widened more easily.

The core portion 110 may include a ground pattern 112G. The ground pattern 112G may provide a boundary condition of the antenna applied to the antenna substrate 100A. For example, an RF signal, emitted from the antenna, may be reflected. Accordingly, the antenna may be more concentrated in a thickness direction, the gain and/or directivity of the antenna could be further improved. The ground pattern 112G may substantially block an antenna and a feed unit 130, and thus electromagnetic isolation between the antenna and the feed unit 130 may be improved. Accordingly, noise flowing in an RF signal transmission process between an antenna and an RFIC 330 to be described later may be reduced.

The feed unit 130 may include a feed pattern 132F. The feed pattern 132F may be disposed below the ground pattern 112G. The RF signal may flow in a horizontal direction (x-direction and/or y-direction) through the feed pattern 132F. Thus, a plurality of antennas may be efficiently arranged above the ground pattern 112G. The feed pattern 132F may be electrically connected to the patch patterns 122A1 and 112A1.

The passivation layers 140 and 150 are additional components which can protect an internal configuration of the antenna substrate 100A according to an embodiment from external physical and chemical damage. Each of the passivation layers 140 and 150 may include a thermosetting resin. For example, each of the passivation layers 140 and 150 may be an ABF. However, it is not limited thereto, and each of the passivation layers 140 and 150 may be a known Solder Resist (SR) layer. Moreover, if necessary, PID may be included therein. Moreover, if necessary, a high rigid material such as a prepreg may be used for warpage improvement. The second passivation layer 150 may have a plurality of openings 150*h*, and the plurality of openings 150*h* may expose at least a portion of a pattern layer 132 in a lowermost portion from the second passivation layer 150. Meanwhile, a surface treatment layer may be formed on an exposed surface of a pattern layer 132 in a lowermost portion. The surface treatment layer may be formed using, for example, electrolytic gold plating, electroless gold plating, Organic Solderability Preservative (OSP) or electroless tin plating, electroless silver plating, electroless nickel plating/replacement plating, Direct Immersion Gold (DIG) plating, Hot Air Solder Leveling (HASL), or the like. Each of openings 150*h* may be composed of a plurality of via holes. An under bump metal (UBM) may be disposed on each opening 150*h* to improve reliability.

Each of the electronic components 310, 320, and 330 may be a known active or passive component. Each of the electronic components 310, 320, and 330 may be disposed in the surface mount type on the second passivation layer 150 below the feed unit 130 of the antenna substrate 100A through an electrical connection metal formed on the plurality of openings 150*h*, for example, a solder. Each of the electronic components 310, 320, and 330 may be electrically connected to each of at least a portion of a pattern layer 132 of the feed unit 130, and may also be electrically connected to each of at least a portion of the pattern layer 122 of the antenna unit 120 depending on the function. Each of the first and third electronic components 310 and 330 may be a semiconductor chip or a semiconductor package including a semiconductor chip. The semiconductor chip may be a PMIC 310 and/or an RFIC 330, but is not necessarily limited thereto. The second electronic component 320 may be a passive component in the form of a chip, for example, a capacitor in the form of a chip, an inductor in the form of a chip, or the like. The antenna module 500 according to an embodiment may be provided through the arrangement of the electronic components 310, 320, and 330. The number of electronic components 310, 320, and 330 is not particularly limited, and may further include other surface mount components in addition to the above-described types of the components.

If necessary, a connector 400 may be further disposed below the feed unit 130 of the antenna substrate 100A. Through the connector 400, the antenna module 500 may be physically and/or electrically connected to other components in an electronic device. For example, the antenna module may be connected to a mainboard of an electronic device through a connector, but it is not limited thereto.

Figure 6:
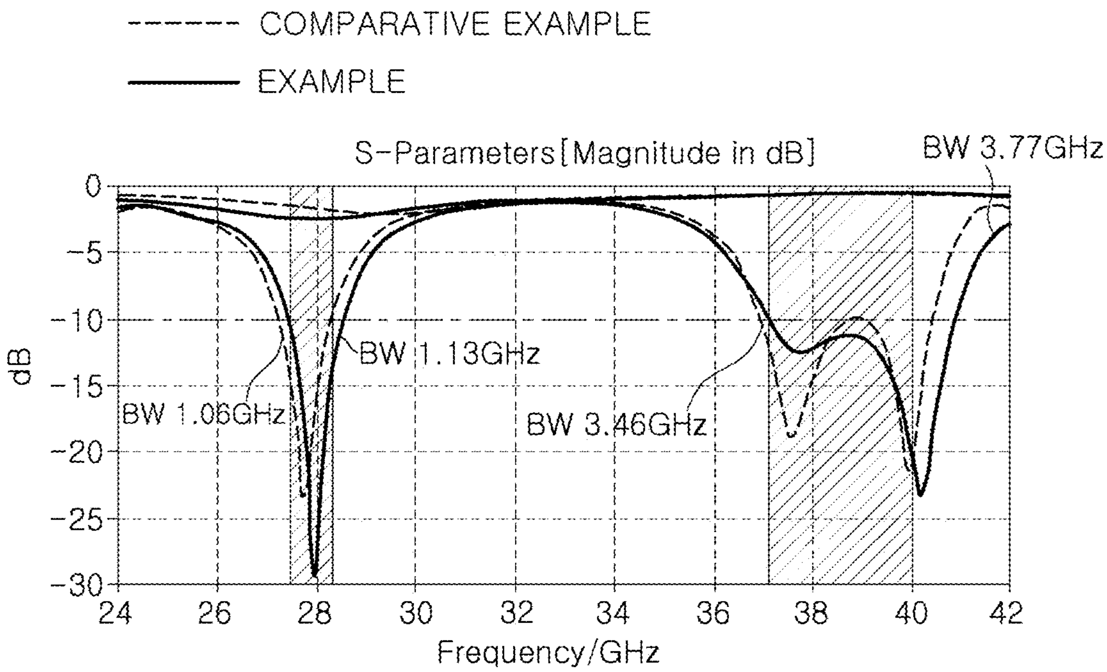
FIG. 6 schematically illustrates antenna bandwidth effects of the antenna module of FIG. 3.

FIG. 6 schematically illustrates antenna bandwidth effects of the antenna module of FIG. 3.

FIG. 7 schematically illustrates antenna gain effects of the antenna module of FIG. 3.

In the drawings, an example is a simulation result for a gain and an antenna bandwidth of an antenna module 500 to which a structure of an antenna substrate 100A according to an embodiment described above is applied. Moreover, a comparative example is a simulation result for a gain and an antenna bandwidth of an antenna module to which an antenna substrate is applied in the case in which a thickness of an insulating layer 121 of an antenna unit 120 and a thickness of an insulating layer 131 of a feed unit 130 are equal to each other in a structure of an antenna substrate 100A according to an embodiment. The thicknesses of the antenna modules according to an example and a comparative example are equal to each other, and the pattern design and the type of a component applied thereto are also the same.

Referring to the drawings, in a structure according to an example as compared with a structure according to a comparative example, a bandwidth at a low frequency of about 27.5 GHZ to about 28.35 GHZ is increased from about 1.06 GHz to about 1.13 GHz by about 6.6%. Moreover, a bandwidth at a high frequency of about 37 GHz to 40 GHz is increased from about 3.45 GHz to about 3.77 GHz. In this case, it can be seen that the bandwidth is increased by about 9%. Moreover, it can be seen that a gain at the low frequency is increased from about 3.75 dBi to about 4.02 dBi by about 7%, while a gain at the high frequency is increased from about 4.59 dBi to about 4.91 dBi by about 7%.

Figure 8:
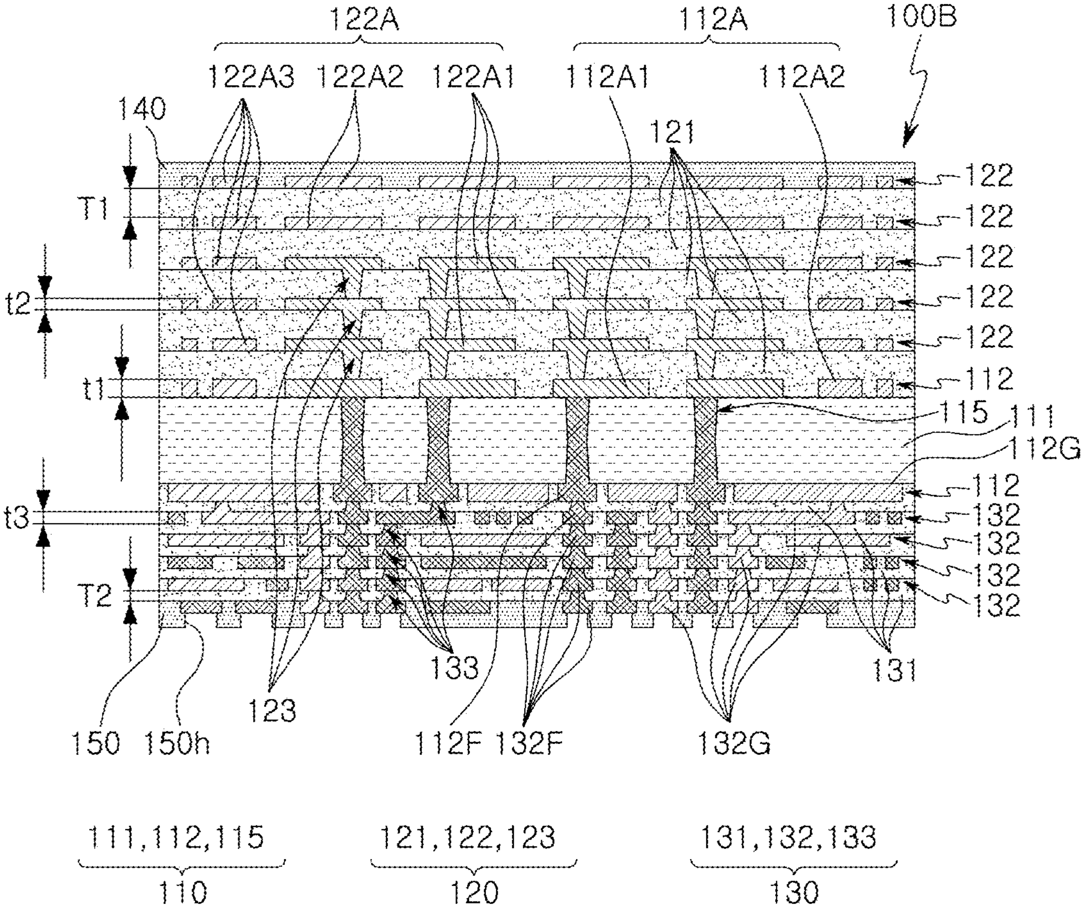
FIG. 8 is a schematic cross-sectional view illustrating another example of an antenna substrate.

FIG. 8 is a schematic cross-sectional view illustrating another example of an antenna substrate.

Referring to FIG. 8, in an antenna substrate 100B according to another embodiment, a thickness t1 of a core wiring layer 112 of a core portion 110 is greater than a thickness t2 of each pattern layer 122 of an antenna unit 120 and/or a thickness t3 of each pattern layer 132 of a feed unit 130. In this regard, a ratio of a metal with excellent rigidity is increased, and thus a warpage improvement effect may be provided.

The antenna substrate 100B according to another embodiment is also applied to an antenna module 500 according to an embodiment.

Other descriptions are substantially the same as described above in the antenna substrate 100A and the antenna module 500 including the same according to the above-described embodiment, and thus a detailed description thereof will be omitted.

Figure 9:
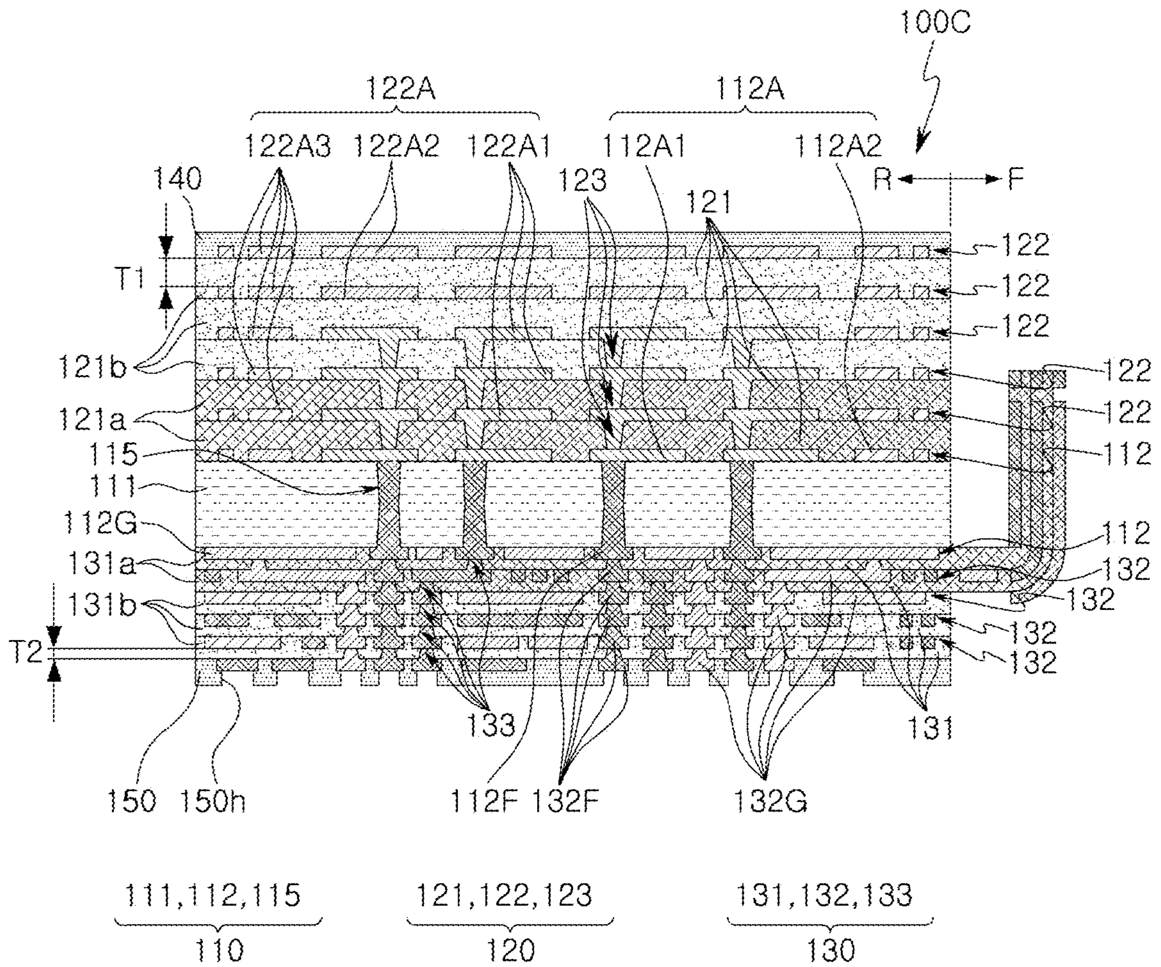
FIG. 9 is a schematic cross-sectional view illustrating another example of an antenna substrate.

FIG. 9 is a schematic cross-sectional view illustrating another example of an antenna substrate.

Referring to FIG. 9, an antenna substrate 100C according to another embodiment is a rigid-flexible substrate having a rigid portion R and a flexible portion F. The flexible portion R refers to an area having the excellent bending performance (or being more flexible) as compared with the rigid portion R. The rigid portion R includes the core portion 110, the antenna unit 120, the feed unit 130, and the passivation layers 140 and 150, described above. The flexible portion F extends from the feed unit 130 of the rigid portion R. The electronic components 310, 320, and 330 may be disposed on the rigid portion R.

The antenna unit 120 includes a plurality of first insulating layers 121*a*, relatively flexible, and a plurality of second insulating layers 121*b*, relatively rigid. The feed unit 130 also includes a plurality of first insulating layers 131*a*, relatively flexible, and a plurality of second insulating layers 131*b*, relatively rigid. Relatively flexible refers to relatively more bending characteristics. Relatively rigid refers to relatively greater rigidity. For example, each of the first insulating layers 121*a* and 131*a* may have a smaller elastic modulus than each of the second insulating layers 121*b* and 131*b*. Each of the first insulating layers 121*a* and 131*a* includes a Flexible Copper Clad Laminate (FCCL) material such as PI. The flexible portion F may include first insulating layers 131*a* of the feed unit 130 and a pattern layer 132 formed on each of the first insulating layers 131, but is not limited thereto.

The antenna substrate 100C according to another embodiment is also applied to an antenna module 500 according to an embodiment.

Other descriptions are substantially the same as described above in the antenna substrate 100A and the antenna module 500 including the same according to the above-described embodiment, and thus a detailed description thereof will be omitted. Meanwhile, characteristics of the antenna substrate 100B according to another embodiment may also be applied to the antenna substrate 100C according to another embodiment.

Figure 10:
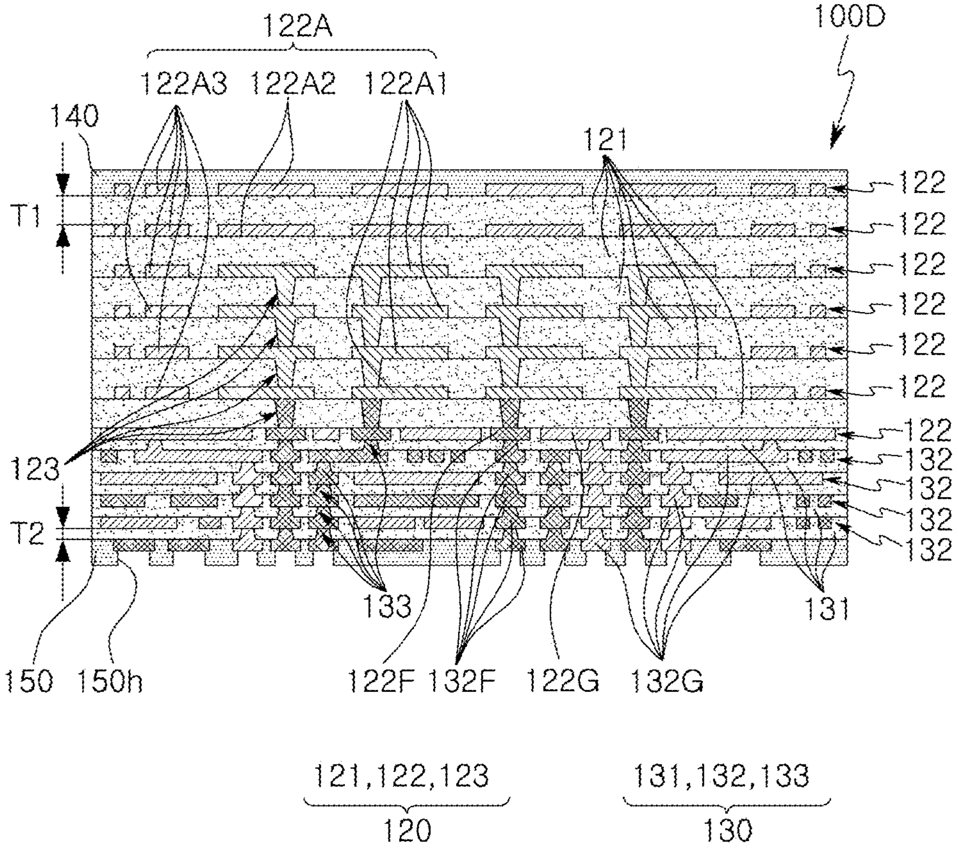
FIG. 10 is a schematic cross-sectional view illustrating another example of an antenna substrate.

FIG. 10 is a schematic cross-sectional view illustrating another example of an antenna substrate.

Referring to FIG. 10, an antenna substrate 100D according to another embodiment may be a coreless-type PCB. For example, the antenna unit 120 and the feed unit 130 may be in direct contact with each other. For example, the antenna unit 120 may further include an insulating layer 121 in a lowermost portion, in contact with an insulating layer 131 in an uppermost portion of the feed unit 130. Pattern layers 122 may be disposed on both surfaces of an insulating layer 131 in a lowermost portion of the antenna unit 120. The pattern layer 122, disposed on an upper surface of an insulating layer 121 in a lowermost portion of the antenna unit 120, may include an antenna pattern 122A, for example, a feed pattern 122A1. The pattern layer 122, disposed on a lower surface of an insulating layer 121 in a lowermost portion of the antenna unit 120, may include a ground pattern 122G. The pattern layer 122, disposed on a lower surface of an insulating layer 121 in a lowermost portion of the antenna unit 120, may further include a feed pattern 122F formed in a hole region of the ground pattern 122G. A thickness of the insulating region, provided by an insulating layer 121 in a lowermost portion of the antenna unit 120, may be greater than a thickness of an insulating region, provided by an insulating layer 131 in an uppermost portion of the feed unit 130.

A connection via layer 123 in a lowermost portion, passing through an insulating layer 121 in a lowermost portion of the antenna unit 120, may be a metal bump layer or a metal paste layer. For example, each of the antenna unit 120 and the feed unit 130 is formed except for an insulating layer 121 in a lowermost portion and a connection via layer 123 in a lowermost portion, and then, an insulating layer 121 in a lowermost portion and a connection via layer 123 in a lowermost portion are disposed between the antenna unit 120 and the feed unit 130, and a batch lamination method is used to manufacture an antenna substrate 100D according to another embodiment. A boundary between each of a metal bump layer and a metal paste layer and plating layers of the pattern layers 122 and 132 may be distinguished.

A plurality of connection via layers 133, passing through a plurality of insulating layers 131 of the feed unit 130, respectively, may also be a metal bump layer or a metal paste layer. For example, an antenna unit 120 is formed except for an insulating layer 121 in a lowermost portion and a connection via layer 123 in a lowermost portion, and then, a batch lamination method of respective layers, forming the antenna unit 120, the insulating layer 121 in a lowermost portion, the connection via layer 123 in a lowermost portion, and the feed unit 130, are used to manufacture an antenna substrate 100D according to another embodiment. A boundary between each of a metal bump layer and a metal paste layer and plating layers of the pattern layers 122 and 132 may be distinguished.

The antenna substrate 100D according to another embodiment is also applied to an antenna module 500 according to an embodiment.

Other descriptions are substantially the same as described above in the antenna substrate 100A and the antenna module 500 including the same according to the above-described embodiment, and thus a detailed description thereof will be omitted. Meanwhile, characteristics of each of the antenna substrates 100B and 100C according to another embodiment may also be applied to the antenna substrate 100D according to another embodiment solely or in combination.

As set forth above, according to example embodiments of the present inventive concept, an antenna substrate capable of improving antenna performance and an antenna module including the same are provided.

Moreover, an antenna substrate, in which miniaturization is possible, and an antenna module including the same are provided.

While example embodiments have been shown and described above, it will be apparent to those skilled in the art that modifications and variations could be made without departing from the scope of the present disclosure, as defined by the appended claims.

What is claimed is:

1. An antenna substrate, comprising:

an antenna unit including first and second pattern layers, and a plurality of insulating layers including a first insulating layer providing a first insulating region between the first and second pattern layers and being in contact with the first and second pattern layers;

a feed unit including third and fourth pattern layers, and a second insulating layer providing a second insulating region between the third and fourth pattern layers; and a core portion including a core layer, and first and second core pattern layers adjacent to each other with the core layer interposed therebetween, wherein each of the first and second pattern layers, and the first core pattern layer, includes an antenna pattern, each of the third and fourth pattern layers includes a feed pattern, the core portion is disposed between the antenna unit and the feed unit, the first insulating region is thicker than the second insulating region, the plurality of insulating layers of the antenna unit include a third insulating layer interposed between the first core pattern layer and the first pattern layer, and the third insulating layer is in contact with the first insulating layer and the first pattern layer, and in direct contact with the core layer.

2. The antenna substrate of claim 1, wherein a thickness of the antenna unit is greater than a thickness of the feed unit.

3. The antenna substrate of claim 1, wherein a thickness of the core layer is greater than a thickness of each of the plurality of insulating layers included in the antenna unit and a thickness of each of a plurality of insulating layers included in the feeding unit.

4. The antenna substrate of claim 1, wherein the third insulating layer of the plurality of insulating layers included in the antenna unit provides a third insulating region between the first pattern layer and the first core pattern layer, a fourth insulating layer of the plurality of insulating layers included in the feeding unit provides a fourth insulating region between the third pattern layer and the second core pattern layer, the second pattern layer, the first pattern layer, the first core pattern layer, the second core pattern layer, the third pattern layer, and the fourth pattern layer are disposed in this order or vice versa in a stacking direction of the feed unit, the core portion, and the antenna unit, and the third insulating region is thicker than the fourth insulating region.

5. The antenna substrate of claim 4, wherein the fourth insulating layer is interposed between the second core pattern layer and the third pattern layer, the fourth insulating layer is in contact with the second insulating layer and the third pattern layer.

6. The antenna substrate of claim 1, wherein the number of the plurality of insulating layers included in the antenna unit and the number of the plurality of insulating layers included the feed unit are the same.

7. The antenna substrate of claim 1, wherein a thickness of the first core pattern layer is thicker than a thickness of each of the first and second pattern layers.

8. The antenna substrate of claim 1, wherein a thickness of the second core pattern layer is thicker than a thickness of each of the third and fourth pattern layers.

9. The antenna substrate of claim 1, wherein the antenna unit further includes a fifth pattern layer, a fifth insulating layer of the plurality of insulating layers included in the antenna unit provides a fifth insulating region between the second and fifth pattern layers, the feed unit further includes a sixth pattern layer, a sixth insulating layer of a plurality of insulating layers included in the feed unit provides a sixth insulating region between the fourth and sixth pattern layers, the fifth pattern layer, the second pattern layer, the first pattern layer, the third pattern layer, the fourth pattern layer, and the sixth pattern layer are disposed in this order or vice versa in a stacking direction of the feed unit and the antenna unit, the fifth pattern layer includes an antenna pattern, the sixth pattern layer includes a feed pattern, the first insulating region is thicker than each of the second and sixth insulating regions, and the fifth insulating region is thicker than each of the second and sixth insulating regions.

10. The antenna substrate of claim 9, wherein the fifth insulating layer is in contact with an upper portion of the first insulating layer and the second pattern layer.

11. An antenna substrate, comprising:

a plurality of first insulating layers;

a plurality of first pattern layers, each including an antenna pattern and disposed directly on an upper surface of a respective one of the plurality of first insulating layers;

a plurality of second insulating layers;

a plurality of second pattern layers, each including a feed pattern and disposed directly on a lower surface of a respective one of the plurality of second insulating layers; and passivation layers respectively disposed on an upper surface of an uppermost layer of the plurality of first insulating layers and a lower surface of a lowermost layer of the plurality of second insulating layers, wherein a lowermost layer of the plurality of first insulating layers directly contacts with an uppermost layer of the plurality of the second insulating layers, a thickness of the lowermost layer of the plurality of first insulating layers is greater than a thickness of the uppermost layer of the plurality of the second insulating layers, and the number of the plurality of first insulating layers is greater than the number of the plurality of second insulating layers.

12. The antenna substrate of claim 11, wherein a sum of thicknesses of the plurality of first insulating layers is greater than a sum of thicknesses of the plurality of second insulating layers.

13. The antenna substrate of claim 11, further comprising a flexible portion extending from at least one of the plurality of second insulating layers and one of the plurality of second pattern layers.

14. The antenna substrate of claim 11, wherein a thickness of each of the plurality of first insulating layers is greater than a thickness of each of the plurality of second insulating layers.

* * * * *